(12) United States Patent
Bianchi et al.

(10) Patent No.: US 7,898,944 B2
(45) Date of Patent: Mar. 1, 2011

(54) SMART MECHANISM FOR MULTI-CLIENT BIDIRECTIONAL OPTICAL CHANNEL PROTECTION SCHEME

(75) Inventors: David Bianchi, Cambiago (IT);
Giovanni Tandi, Fara Gera d'Adda (IT);
Gilberto Loprieno, Milan (IT)

(73) Assignee: Cisco Technology, Inc., San Jose, CA (US)

( * ) Notice: Subject to any disclaimer, the term of this patent is extended or adjusted under 35 U.S.C. 154(b) by 1034 days.

(21) Appl. No.: 11/306,002

(22) Filed: Dec. 14, 2005

(65) Prior Publication Data

US 2007/0133397 A1 Jun. 14, 2007

(51) Int. Cl.
*H04J 3/14* (2006.01)
*G01R 31/08* (2006.01)
*H04L 12/26* (2006.01)
*H04L 12/56* (2006.01)

(52) U.S. Cl. ......... 370/225; 370/236; 370/244; 370/248; 370/258; 370/392; 370/469; 370/474; 370/907

(58) Field of Classification Search .......... 370/216–228, 370/236.3, 241–252, 254, 258, 389, 392, 370/469–475, 709, 236.2, 236
See application file for complete search history.

(56) References Cited

U.S. PATENT DOCUMENTS

| | | | | |
|---|---|---|---|---|
| 5,978,354 A * | 11/1999 | Taketomi et al. | ............. | 370/226 |
| 6,141,320 A * | 10/2000 | Ikawa | ............... | 370/227 |
| 6,888,791 B1 * | 5/2005 | Ellis et al. | ............... | 370/227 |
| 7,042,904 B2 * | 5/2006 | Kamiya | ............... | 370/466 |
| 7,127,653 B1 * | 10/2006 | Gorshe | ............... | 714/746 |
| 7,298,694 B2 * | 11/2007 | Kamiya et al. | ............... | 370/218 |
| 7,352,780 B1 * | 4/2008 | Conklin et al. | ............... | 370/514 |
| 7,359,331 B2 * | 4/2008 | Takamichi | ............... | 370/245 |
| 7,394,758 B2 * | 7/2008 | Gonda | ............... | 370/218 |
| 7,519,080 B2 * | 4/2009 | Xiong et al. | ............... | 370/466 |
| 7,565,442 B1 * | 7/2009 | Yao et al. | ............... | 709/237 |
| 7,583,599 B1 * | 9/2009 | Ling et al. | ............... | 370/235 |
| 7,672,323 B2 * | 3/2010 | Sundaram et al. | ............... | 370/412 |
| 2002/0083190 A1 * | 6/2002 | Kamiya et al. | ............... | 709/236 |
| 2002/0118637 A1 * | 8/2002 | Manganini et al. | ............... | 370/222 |
| 2003/0189895 A1 * | 10/2003 | Limaye et al. | ............... | 370/216 |
| 2004/0156389 A1 * | 8/2004 | Sha | ............... | 370/466 |
| 2004/0170128 A1 * | 9/2004 | Takamichi | ............... | 370/245 |
| 2005/0041575 A1 * | 2/2005 | Kam et al. | ............... | 370/216 |
| 2005/0058060 A1 * | 3/2005 | Caldwell et al. | ............... | 370/216 |
| 2005/0099941 A1 * | 5/2005 | Sestito et al. | ............... | 370/228 |
| 2006/0002304 A1 * | 1/2006 | Ashwood-Smith | ............... | 370/238 |

(Continued)

OTHER PUBLICATIONS

George young et al, Sonet/SDH and OTN Generic Framing Procedure (GFP) Adaptation/Encapsulation of 802.17 MAC Clients, SBC Technology Resources, INC IEEE 802. May 17, 2000.*

*Primary Examiner* — Chi H Pham
*Assistant Examiner* — Ahmed Elallam (57) ABSTRACT

Methods and apparatus for efficiently allowing protection switch information to be communicated on bidirectional lines are disclosed. According to one aspect of the present invention, a method for communicating protection switch information from a first network element to a second network element across bidirectional links that include at least one working line and a protection line involves obtaining a generic framing procedure GFP frame at the first network element. The GFP frame has a payload area with a client payload field. The method also includes defining a command field associated with the GFP frame that is in the payload area but not in the client payload field, and storing protection switch information in the command field.

32 Claims, 8 Drawing Sheets

U.S. PATENT DOCUMENTS

| | | | |
|---|---|---|---|
| 2006/0092979 A1* | 5/2006 | Peng et al. | 370/474 |
| 2006/0153179 A1* | 7/2006 | Ho et al. | 370/386 |
| 2006/0165089 A1* | 7/2006 | Klink | 370/395.5 |
| 2007/0030800 A1* | 2/2007 | Hosler et al. | 370/217 |
| 2009/0202239 A1* | 8/2009 | Holness et al. | 398/33 |

* cited by examiner

SMART MECHANISM FOR MULTI-CLIENT BIDIRECTIONAL OPTICAL CHANNEL PROTECTION SCHEME

BACKGROUND OF THE INVENTION

1. Field of Invention

The present invention relates generally to optical networks. More particularly, the present invention relates to a smart management frame in which the payload of the frame is used to transport protection switch information.

2. Description of the Related Art

Within Synchronous Optical Network (SONET) and Synchronous Digital Hierarchy (SDH) transport networks, automatic protection switching (APS) enables working interfaces to be protected by backup interfaces. When a working interface fails, a backup interface assumes the traffic load of the working interface. In other words, APS provides the capability to detect a failure in an interface and to switch the traffic load of the failed interface to another interface.

Protection switching is typically implemented through the utilization of K1 and K2 bytes in a line overhead of a SONET or SDH signal. When a signal failure is detected or when signal degradation is detected, protection switching may be initiated. K1 and K2 bytes are used to effectively signal a line level protection switch.

Figure 1A:
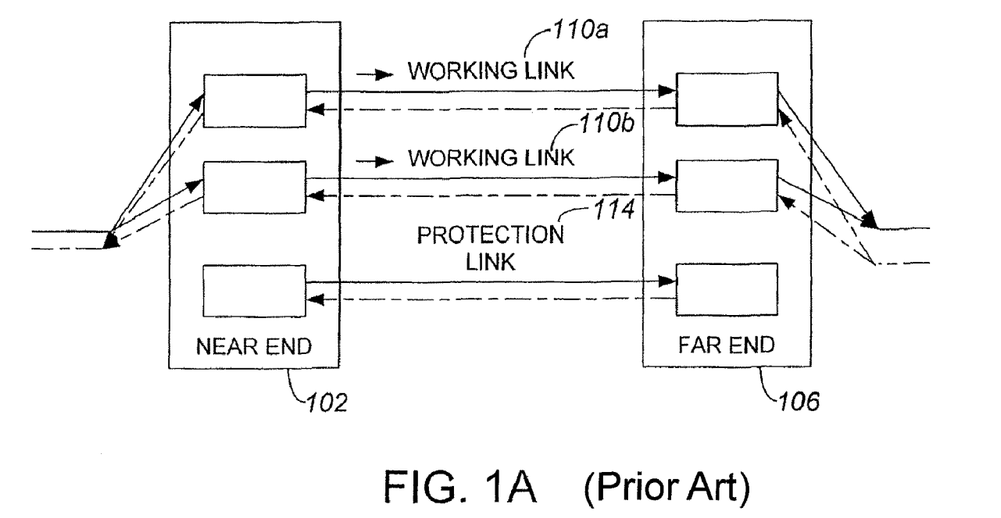
FIG. 1A is a diagrammatic representation of a near end and a far end that are in communication over a plurality of working links and a protection link.
Figure 1B:
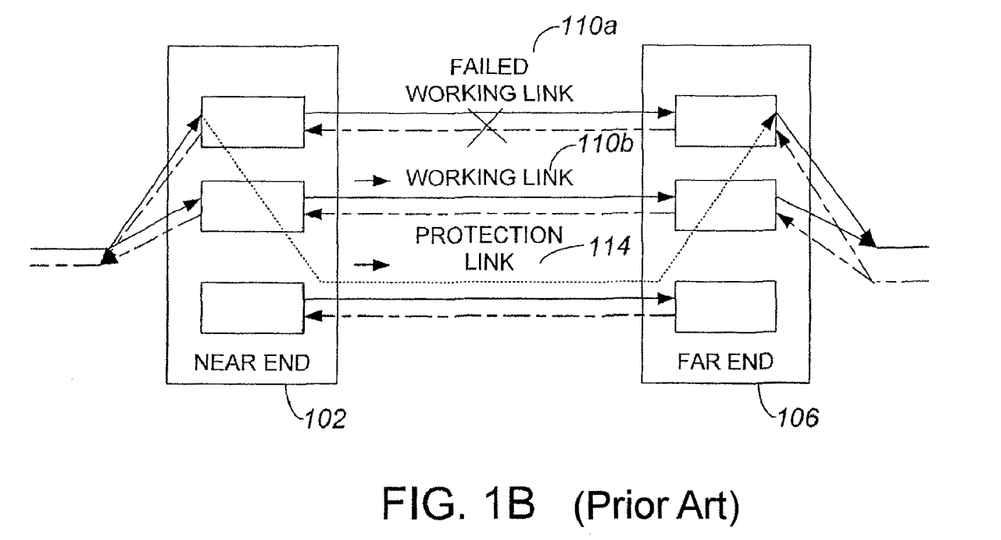
FIG. 1B is a diagrammatic representation of a near end and a far end that are in communication over a plurality of working links and a protection link, i.e., near end 102 and far end 106 of FIG. 1A, in which a working link has failed.

With reference to FIGS. 1A and 1B, protection switching which uses K1 and K2 bytes in the line overhead of a signal will be described. FIG. 1A is a diagrammatic representation of a near end and a far end that are in communication over a plurality of working links and a protection link. That is, FIG. 1A depicts a 1:N protection scheme. It should be appreciated that N is generally an integer which has a value between one and fourteen, inclusive. Optical signals are typically sent from a source or a near end 102 to a destination or a far end 106 over working links 110a, 110b. A protection link 114 is generally not used until one of working links 110a, 110b fails. As shown, working links 110a, 110b and protection link 114 are bidirectional.

When working link 110a fails, as indicated in FIG. 1B, far end 106 detects the failure and sends a message using bits of a K1 byte to near end 102 over protection link 114. Generally, bits five through eight of a K1 byte are used to hold a switch action channel request. Hence, by sending a message in bits five through eight of the K1 byte, far end 106 requests that near end 102 switch from transmitting over working links 110a, 110b to transmitting over working link 110b and protection link 114. In response to the message sent by far end 106, near end may switch from transmitting on working links 110a, 110b to transmitting on working link 110b and protection link 114.

Figure 2:
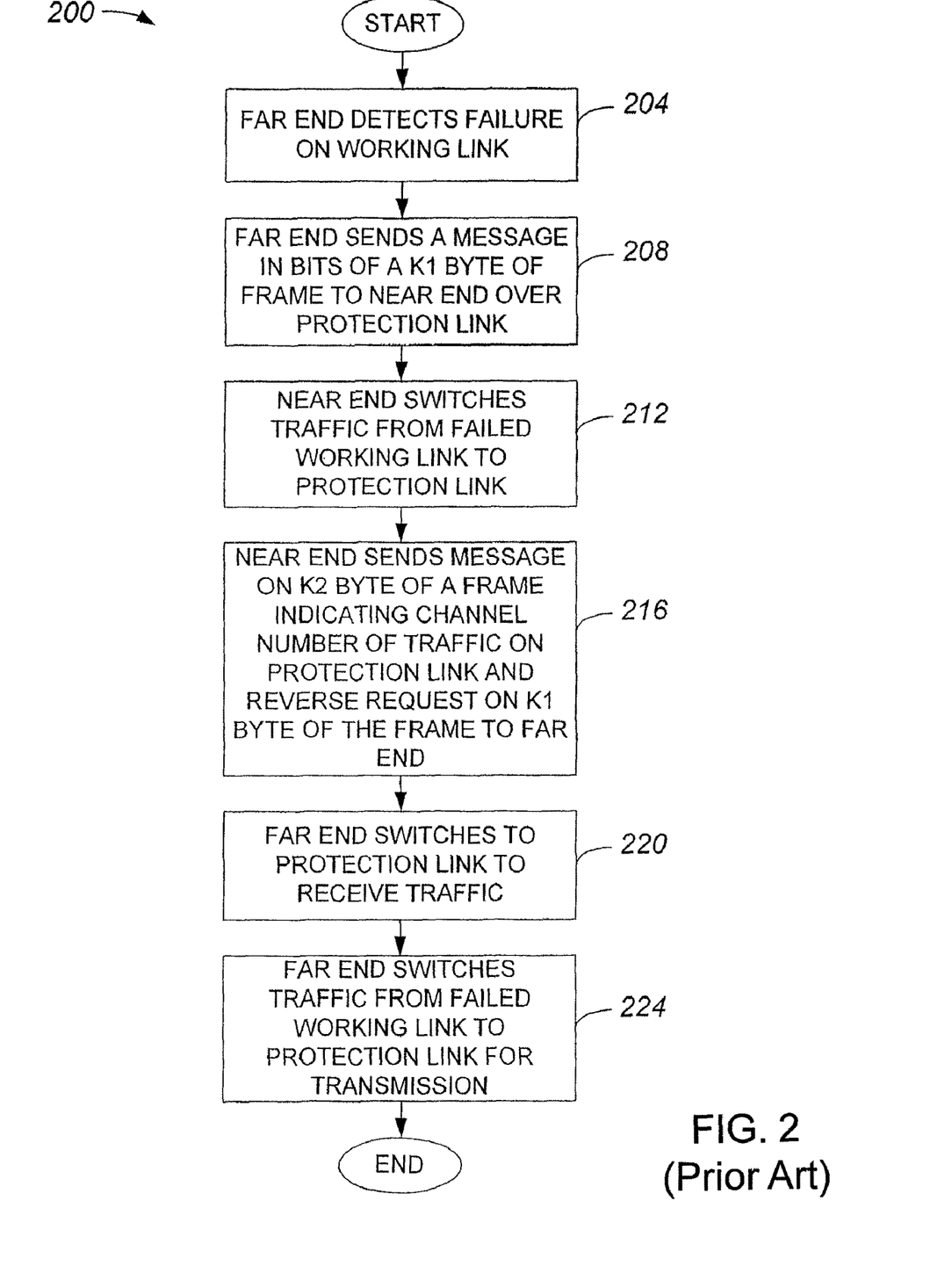
FIG. 2 is a process flow diagram which illustrates one method of implementing protection switching.

With reference to FIG. 2, the steps associated with implementing protection switching in a 1:N protection architecture will be described. A process 200 of implementing protection switching begins at step 204 in which a far end detects a failure on a working link between a near end and the far end. The working link has an associated protection link. Upon detecting a failure, the far end sends a message in a K1 byte of a frame to the near end in step 208. The K1 byte generally includes bits that indicate a switching priority and bits that indicate a requested switch action.

In step 212, the near end receives the message and switches traffic from the working link with the failure, i.e., the failed working link, to the protection link associated with the failed working link. Then, in step 216, the near end sends a message using a K1 byte and a K2 byte of a frame to the far end. Bits in the K2 byte are used to indicate a channel number for data traffic sent over the protection link, and bits in the K1 byte are used to send a reverse request. The reverse request is typically used to initiate a bidirectional switch action.

The message sent by the near end is received by the far end, and in step 220, the far end switches to the protection link to receive traffic. After the far end switches to the protected link, the far end switches traffic from the failed working link to the protection link to transmit traffic in step 224. That is, the far end sets up to transmit packets, as well as to receive packets, using the protection link. Once the far end switches traffic to the protection link, the process of implementing protection switching is completed.

While the use of K1 and K2 bytes in SONET and SDH signals is generally effective for implementing APS, K1 and K2 bytes each only include one byte. The amount of information which may be transmitted using two bytes may be limiting in situations in which it would be desirable to transmit more information relating to APS. Further, K1 and K2 bytes are not transparent to a SONET or SDH cloud.

Therefore, what is desired is a method and an apparatus which allows information associated with a protection switch to be transmitted such that the information is not limited to a maximum of two bytes, and such that the information is transparent to a SONET or SDH cloud. That is, what is needed is a system which allows information typically associated with K1 and K2 bytes to be transmitted in bytes other than standard K1 and K2 bytes.

SUMMARY OF THE INVENTION

The present invention relates to transmitting information associated with automatic protection switching in a command field of a generic framing procedure (GFP) frame. According to one aspect of the present invention, a method for communicating protection switch information from a first network element to a second network element across bidirectional links that include at least one working line and a protection line involves obtaining a GFP frame at the first network element. The GFP frame has a payload area with a client payload field. The method also includes:— defining a command field associated with the GFP frame that is in the payload area but not in the client payload field, and storing protection switch information in the command field.

In one embodiment, the command field has a size of up to approximately four bytes. In another embodiment, the protection switch information includes channel selection information bits associated with at least one channel of the protection line and protection switch priority bits.

The inclusion of protection switch information, e.g., information that is generally associated with K1 and K2 bytes of line overhead, in a command field appended at an end of an overall payload area of a GFP frame allows the protection switch information to be substantially transparent to a SONET or SDH cloud. Further, such information may include up to four bytes, which allows a higher level of protection switch information to be transmitted than would be transmitted in standard K1 and K2 bytes.

According to another aspect of the present invention, a method for processing protection switch information associated with a protection switching arrangement that includes at least one bidirectional primary link and a bidirectional secondary link includes obtaining a GFP frame and reading a protection switch information bit that is stored in a command field of the GFP frame. In one embodiment, the method includes:

storing an additional protection switch information bit in the command field, and sending the GFP frame including the additional protection switch information bit on the bidirectional secondary link.

In accordance with yet another aspect of the present invention, a GFP data structure includes a core header and a payload area. Included in the payload area are a payload header, a payload field, and a command field. The command field is substantially appended to the payload field and arranged contains protection switch information. In one embodiment, the command field is up to approximately four bytes in size. In another embodiment, the command field contains information associated with K1 and K2 bytes.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

A generic framing procedure (GFP) provides a framing mechanism that enables a substantially direct mapping of different data traffic types into frames that are compatible with a Synchronous Optical Network (SONET) protocol and a Synchronous Digital Hierarchy (SDH) protocol. GFP effectively defines a framing approach that enables different traffic types to be transported across a SONET or an SDH network. Hence, using GFP, protocols such as Ethernet and Fiber Channel may be carried over SONET and SDH networks.

Adding protection switch information, e.g., information associated with automatic protection switching (APS), in a command field of an overall payload area of a GFP frame allows the protection switch information to be substantially transparent to a SONET or SDH cloud. Hence, between a near end and a far end of a transmission, protection switch information may be efficiently transmitted and received. In addition, a command field that is added to the end of a client payload field in a GFP frame may include up to four bytes, thereby allowing a higher amount of protection switch information to be transmitted than would be transmitted in standard K1 and K2 bytes in line overhead. The protection switch information is typically control information that may be used to enable protection switching to occur.

Figure 3A:
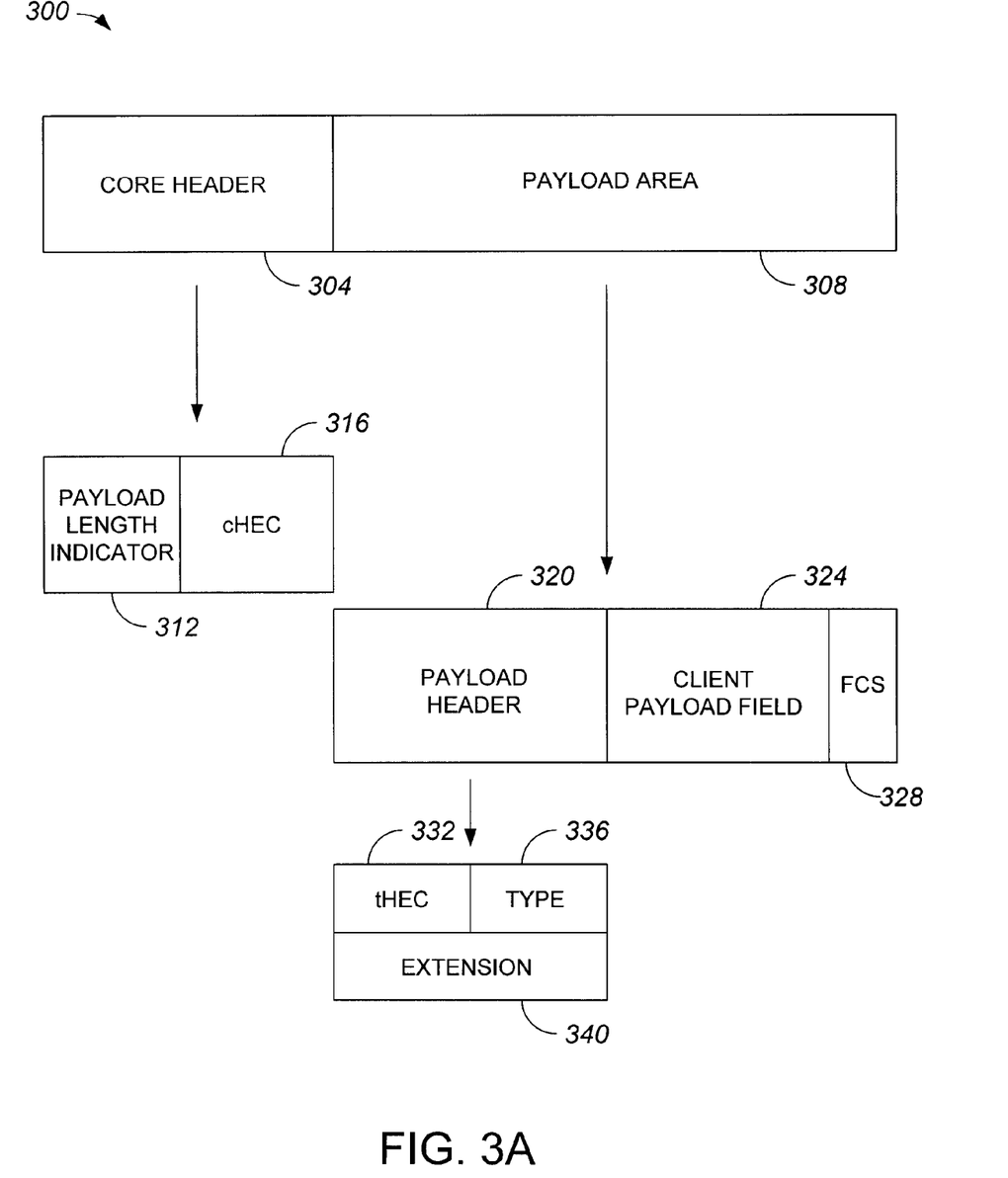
FIG. 3A is a diagrammatic representation of a generic framing procedure (GFP) frame.

FIG. 3a is a diagrammatic representation of a GFP frame. A GFP frame 300 includes a core header 304 and a payload area 308. Core header 304, which has approximately four bytes, includes a payload length indicator 312 and header error correction bits 316. Payload length indicator 312 is typically two bytes that give the length of payload area 308, while header error correction bits 316 are generally sixteen bits or two bytes that contain information which allows for errors within core header 304 to be corrected. Specifically, header error correction bits 316 allows cyclic redundancy check errors to be detected within payload length indicator 312.

In addition to including payload header 320, payload area 308 also includes a client payload field 324 and a frame checking sequence (FCS) field 328. Payload header 320 defines a type of information that is being transported, as well as the contents of client payload field 324. The type of information being transported may be, but is not limited to, client management frames and client information frames. Payload header 320 generally includes a header error correction field 332, a type field 336, and an extension field 340. Header error correction calculation field 332, which is approximately two bytes in length, may contain cyclic redundancy check codes used to detect and to correct cyclic redundancy check errors in payload header 320. Type field 336 is typically two bytes that specify an information type for the contents of client payload field 324. Type field 336 also identifies that FCS 328 is present at the end of frame 300, specifies a type associated with extension 340, and also defines the type of data present in the client payload field 324. Extension field 340, which may have a length of between approximately zero bytes and approximately sixty bytes, may contain information pertaining to frame 300.

Figure 3B:
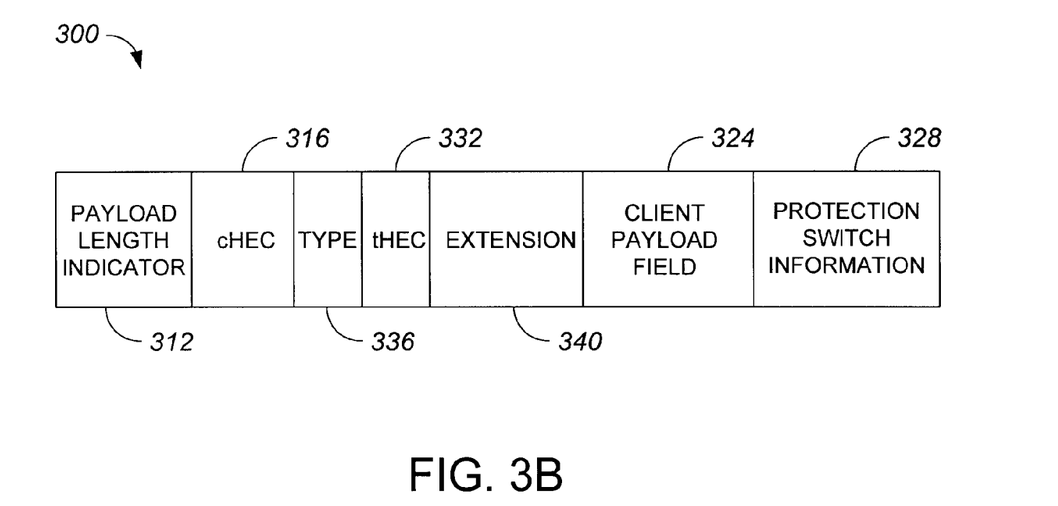
FIG. 3B is a diagrammatic representation of a GFP frame, i.e., GFP frame 300 of FIG. 3A, with protection switch information in a payload area in accordance with an embodiment of the present invention.

Client payload field 324 may include up to approximately 65,541 bytes, and FCS field 328 may include up to approximately four bytes. Client payload field 324 generally contains client data, or native packet information. FCS field 328, in the described embodiment, contains protection switch information. The protection switch information may include information that is typically contained in K1 and K2 bytes in line overhead. That is, FCS field 328 is effectively a command field that may include, but is not limited to including, switch priority information, a switch action request, and a channel number on which data is to be sent on a protection link. As shown in FIG. 3B, protection switch information field 328 is effectively appended onto client payload field 324, and is a part of a payload area within frame 300.

Figure 3C:
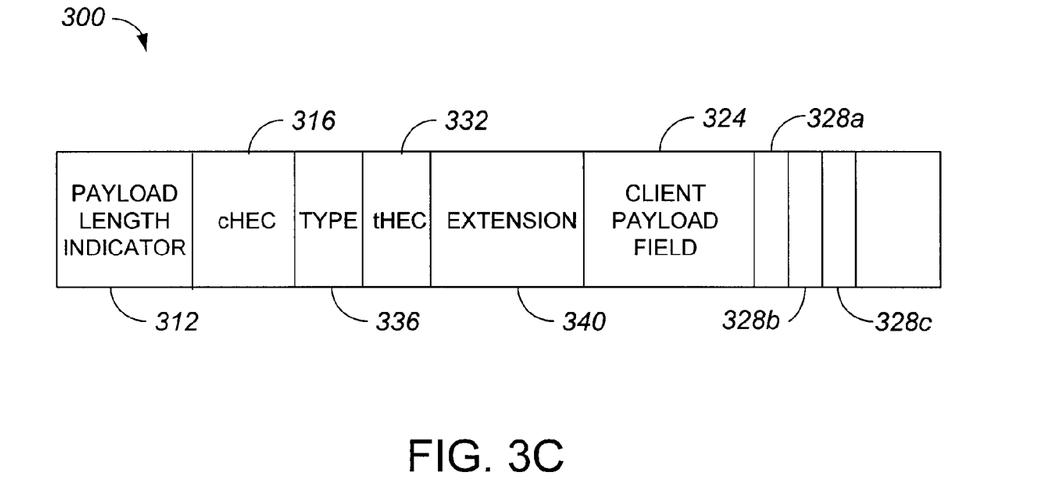
FIG. 3C is a diagrammatic representation of a GFP frame, i.e., GFP frame 300 of FIG. 3A, with protection switch information bits in a protection switch information field of a payload area in accordance with an embodiment of the present invention.

Protection switch information field 328 may include substantially any type of information that may be used for APS signaling. As shown in FIG. 3C, protection switch information field 328 may be divided into any number of sub-fields 328a-d which may each contain any number of bits up to a total of approximately four bytes over sub-fields 328a-d. Although four sub-fields 328a-d are shown, it should be appreciated that there may generally be any number of sub-fields 328a-d. Sub-fields 328a-d may contain, as previously mentioned, information that selects a channel to be used by APS messages, information that selects a bridged channel, information that identifies an APS architecture, and information that identifies bidirectional transmission capabilities. Further, sub-fields 328a-d may also contain condition information such as switch priority information as mentioned above, and information relating to a type of request, e.g., a reverse request, or a reason for a switch request, e.g., a signal failure or a signal degrade.

Figure 4:
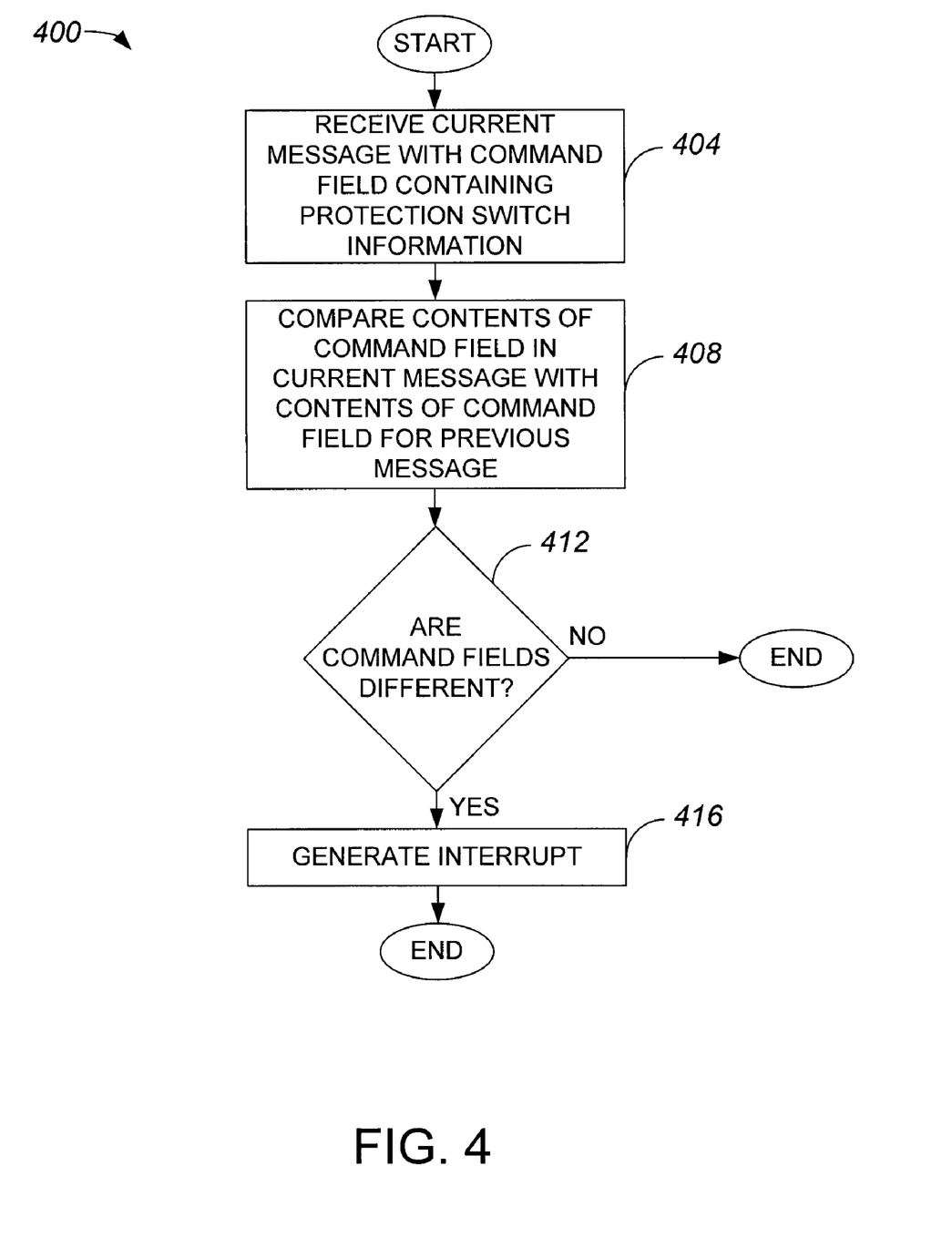
FIG. 4 is a process flow diagram which illustrates one method of processing a message that includes protection switch information stored in a payload area in accordance with an embodiment of the present invention.

With reference to FIG. 4, one method of processing a received client management frame with a command field that contains protection switch information will be described in accordance with an embodiment of the present invention. A method 400 of processing a client management frame begins at step 404 in which a near end or a source receives a message that contains protection switch information. In the described embodiment, the message is a GFP frame with a command field that includes up to approximately four bytes of protection switch information.

After the near end receives the message, i.e., the current message or frame, the near end compares the contents contained in the command field of the current message to the contents of a command field of a previous message in step 408. That is, a comparison is made between the current protection switch information and previous protection switch information. A determination is then made in step 412 regarding whether the contents of the command fields are different. If it is determined that the contents of the command fields are the same, i.e., that the current protection switch information is substantially the same as the previous protection switch information, the indication is that no protection switching is requested. Accordingly, the processing of a client management frame with a command field that contains protection switch information is completed.

Alternatively, if the determination in step 412 that the contents of the command fields are different, the implication is that the far end which sent the message detected a failure on a working link or received a client signal failure indication. That is, if the contents of the command fields are determined to be different, then the indication is that the far end has identified a failure on a working link and has sent a switch action request to the near end in the current message. As such, process flow moves from step 412 to step 416 in which the near end generates an interrupt. Generating an interrupt may include ceasing to send traffic on the working link identified as having failed. When the interrupt is generated, new commands may be acquired, e.g., new commands may be acquired by a microprocessor of the near end from the far end.

Figure 5:
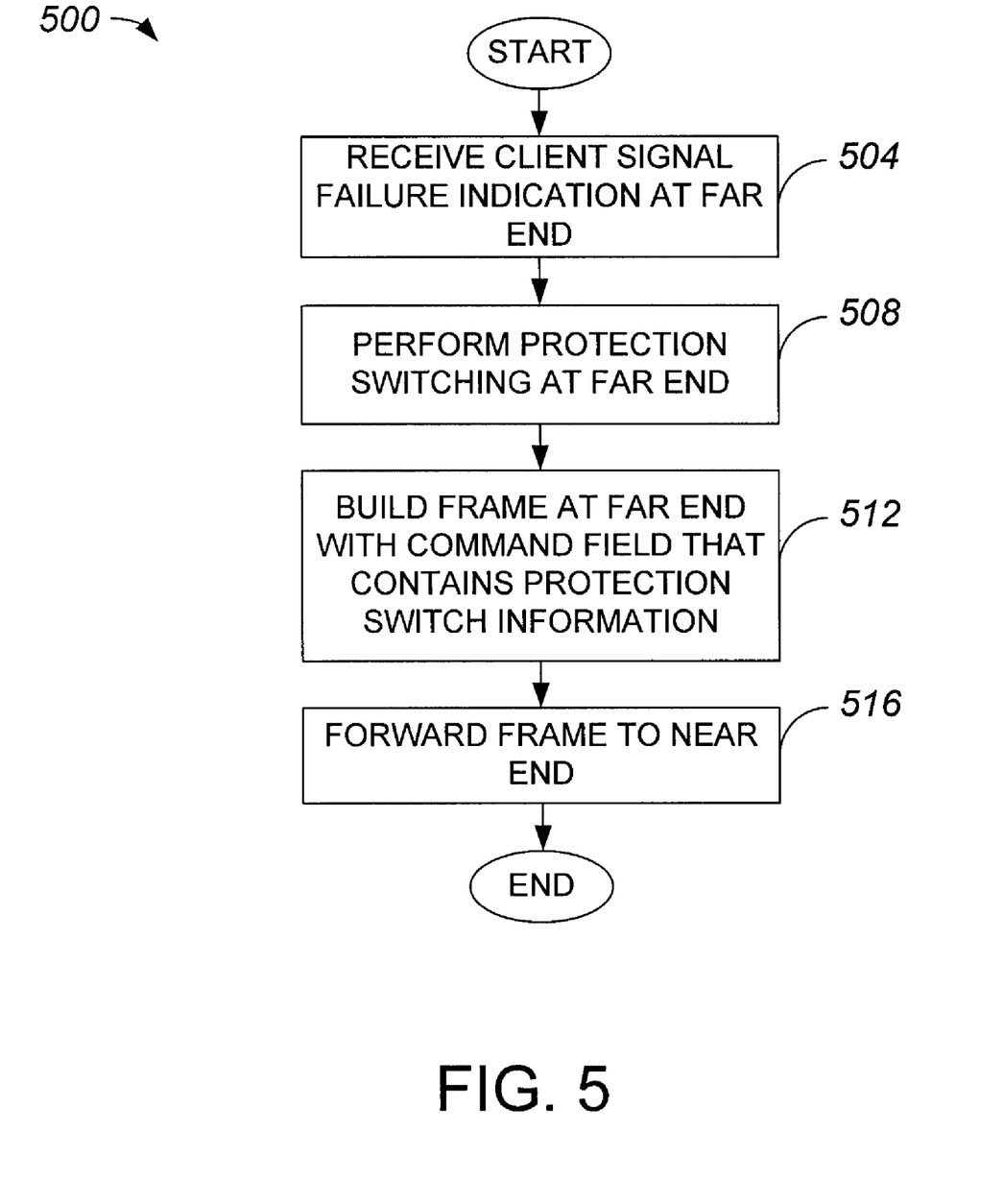
FIG. 5 is a process flow diagram which illustrates one method of processing a client signal failure indication in accordance with an embodiment of the present invention.

In order for a near end to receive protection switch information from a far end, the far end may add protection switch information in a command field of a frame in which there is a client signal failure indication. Referring next to FIG. 5, one process of providing protection switch information from a far end to a near end will be described in accordance with an embodiment of the present invention. A process 500 of providing protection switch information begins at step 504 in which a far end receives a client signal failure indication from a near end. The client signal failure indication is sent to the far end as a part of a client management frame, as will be appreciated by those skilled in the art.

Once the client signal failure indication is received, the far end performs protection switching in step 508, i.e., the far end switches to receiving traffic across a protection link. After the protection switching is performed at the far end, the far end builds a client management frame with a command field into which protection switch information is stored in step 512. As previously discussed, the command field may include up to approximately four bytes. In step 516, the frame built by the far end is forwarded to the near end, and the process of providing protection switch information to a near end is completed.

When a far end sends a client management frame with protection switch information to a near end, the far end may send the client management frame on a protection link as well as on any working or primary links which have not been identified as having a failure associated therewith. By way of example, when the far end and the near end are associated with a 1:N protection scheme and one working or primary link is identified as failed, the client management frame with protection switch information is generally sent on the remaining "N−1" non-failed working links and the protection or secondary link.

Figure 6A:
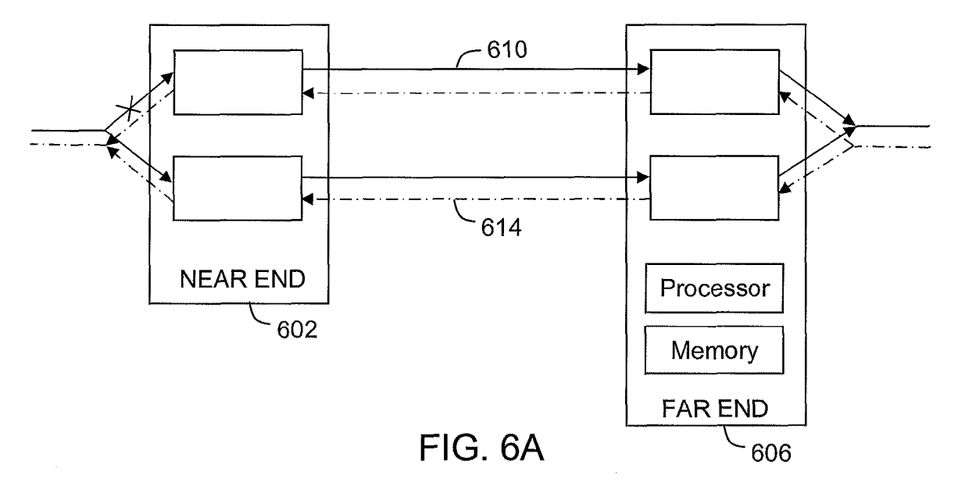
FIG. 6A is a diagrammatic representation of a near end and a far end which are associated with a protection scheme in which a working link has failed in accordance with an embodiment of the present invention.

FIG. 6A is a representation of a near end and a far end within a network in which the near end has an associated failure in accordance with an embodiment of the present invention. A near end 602 and a far end 606 are in communication over at least one bidirectional working or primary link 610 and a bidirectional protection or secondary link 614. It should be appreciated that although only one bidirectional working link 610 is shown, the number of bidirectional working links which may be considered to be included in a cloud between near end 602 and far end 606 may vary widely. Generally, near end 602 and far end 606 may each have components such as processors and memories. In one embodiment, near end 602 and far end 606 may be network elements such as routers, clients, and servers. Further, near end 602 and far end 606 may include muxponders.

Figure 6B:
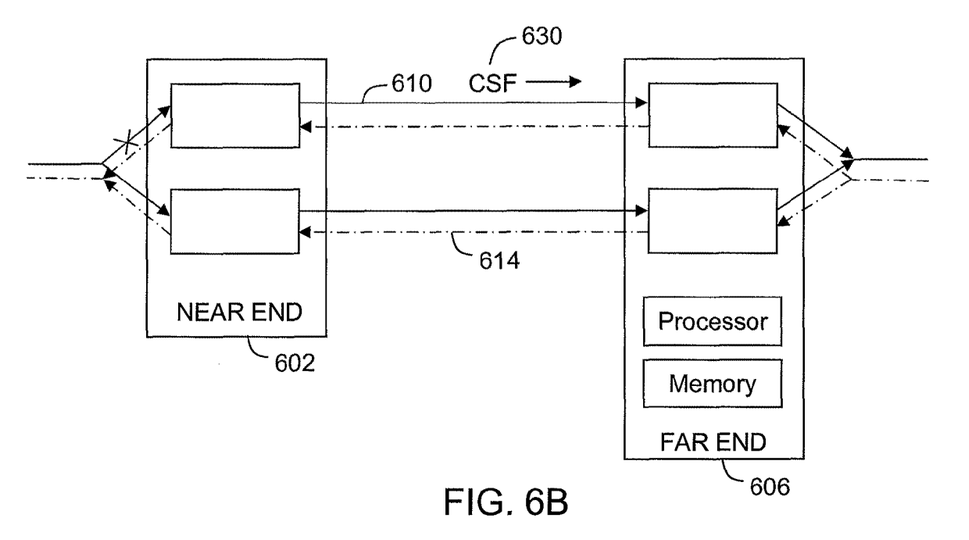
FIG. 6B is a diagrammatic representation of a near end, i.e., near end 602 of FIG. 6A, sending a client signal failure indication to a far end, i.e., far end 606, in accordance with an embodiment of the present invention.

When a failure is associated with near end 602 or, more specifically, when a failure affects working link 610, a client signal failure indication frame 630 may be sent across failed working link 610 to far end 606 as shown in FIG. 6B. Client signal failure indication frame 630 may be embodied in a carrier wave signal when sent across failed working link 610. It should be appreciated that the client signal failure indication frame 630 may be a client management frame that indicates a client signal failure when the client management frame is incomplete. As previously mentioned, a client management frame is generally a GFP frame.

Figure 6C:
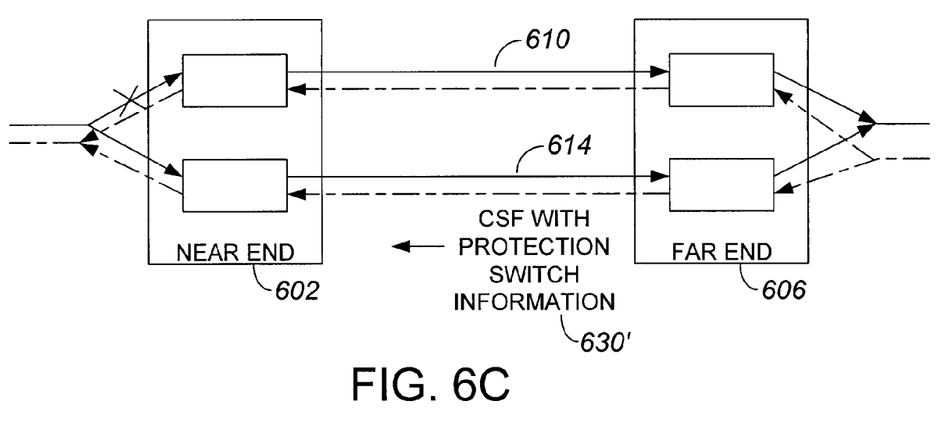
FIG. 6C is a diagrammatic representation of a far end, i.e., far end 606 of FIG. 6a, sending a client signal failure indication with protection switch information to a near end, i.e., near end 602, in accordance with an embodiment of the present invention.

After far end 606 receives client signal failure indication frame 630, far end 606 effectively detects a failure associated with working line 610, and initiates a protection switch. Far end 606 may append up to approximately four bytes onto client signal failure indication frame 630 as a command field. The command field, which is part of a payload area of client signal failure indication frame 630, is arranged to include at least some protection switch information. The protection switch information may be, in one embodiment, up to a four byte representation of information that is typically contained in the K1 and K2 bytes in line overhead. FIG. 6C is a representation of near end 602 and far end 606 after far end 606 sends protection switch information to near end 602. Once protection switch information is added into a command field in client signal failure frame 630, client signal failure frame 630', which includes the command field in which protection switch information is contained, is sent to near end 602 over protection line 614. Near end 602 may process client signal failure frame 630' by using the protection switch information contained therein to switch transmission from failed working line 610 to an appropriate channel on protection line 614. The information regarding the channel onto which transmissions or data traffic has been switched may be sent to far end 606 by near end 602 in a command field of a subsequent frame.

Although only a few embodiments of the present invention have been described, it should be understood that the present invention may be embodied in many other specific forms without departing from the spirit or the scope of the present invention. By way of example, although a command field in which protection switch information is contained has been described as being added or otherwise appended to a client management frame that includes a client signal failure indication, a command field may generally be added to any client management frame. That is, protection switch information may be transmitted from a far end to a near end as a part of substantially any client management frame after a far end receives a client signal failure indication.

A network element that serves as a far end, e.g., network element 606 of FIG. 6A, may be arranged to include either or both hardware and software code devices that enable protection switch information to be added into a GFP frame. Such a network element, when arranged to support software code devices, may include memory or be arranged to support a computer-readable medium that enables software code devices to be stored thereon, as well as a processor that allows the software code devices to execute. Any hardware devices may be implemented, in one embodiment, as an application specific integrated circuit.

The steps associated with the methods of the present invention may vary widely. Steps may be added, removed, altered, and reordered without departing from the spirit of the scope of the present invention. Therefore, the present examples are to be considered as illustrative and not restrictive, and the invention is not to be limited to the details given herein, but may be modified within the scope of the appended claims.

What is claimed is:

1. A method comprising:
   receiving a generic framing procedure (GFP) frame at a first network element for transmission over a working link or a protection link to a second network element, wherein the GFP frame comprises a payload area including a variable length client payload field and a payload header that is at one end of the variable length client payload field so that the payload header is transmitted before the variable length client payload field;
   adding information related to protection switching to a command field;
   appending the command field to the other end of the variable length client payload field within the GFP frame; and
   transmitting the GFP frame from the first network element to the second network element.

2. The method of claim 1, wherein adding the information comprises adding automatic protection switching (APS) architecture information, switch priority information, switch action requests, request type information, bi-directional transmission capabilities, and channel information.

3. The method of claim 1, further comprising:
   receiving the GFP frame at the second network element;
   comparing at the second network element the command field of the GFP frame to a command field of a previously received GFP frame to find a difference between the command fields; and
   generating an interrupt in response to finding a difference between the command fields, wherein the interrupt ceases transmission over the working link by the second network element.

4. The method of claim 1, wherein adding the information comprises adding at least automatic protection switching (APS) information normally contained in K1 and K2 bytes as defined in synchronous optical network (SONET) or synchronous digital hierarchy (SDH) standards.

5. The method of claim 1, further comprising:
   detecting a failure in the working link at the first network element;
   switching communication at the first network element from the working link to the protection link;
   transmitting protection switch information indicating the working link failure in the GFP frame from the first network element to the second network element over the protection link;
   receiving the GFP frame the second network element;
   switching communication at the second network element to the protection link based on the protection switch information in the GFP frame;
   generating a new GFP frame at the second network element comprising protection switch information in a command field acknowledging that protection switching is complete in response to receiving the working link failure indication; and
   transmitting the new GFP frame to the first network element over the protection link.

6. The method of claim 5, wherein transmitting the new GFP frame comprises transmitting the new GFP frame over a different working link in addition to or instead of transmitting over the protection link.

7. The method of claim 5, wherein transmitting the new GFP frame comprises transmitting the new GFP frame via N plurality of working links or the protection link in a 1:N protection scheme, wherein the protection link protects N working links and when a working link fails further comprising rerouting traffic via the remaining N−1 working links and/or the protection link.

8. The method of claim 5, wherein detecting comprises detecting a failure in the working link between the first and second network elements and detecting a failure in the working link that is not between the first and second network elements, wherein if the failure is between the first and second network elements, said transmitting the protection switch information comprises transmitting the protection switch information over the protection link and if the failure is not between the first and second network elements further comprising sending a client signal failure frame over the working link.

9. The method of claim 1, wherein appending comprise appending the command field to the end of the variable length client payload field such that the command field is transparent to a synchronous optical network (SONET) or synchronous digital hierarchy (SDH) cloud.

10. The method of claim 1, wherein the command field comprises the protection switch information instead of a frame checking sequence (FCS).

11. An apparatus comprising:
one or more interfaces configured to transmit and receive generic framing procedure (GFP) frames and GFP client signal failure indication frames comprising protection switch information for transmission over or reception from a working link or a protection link coupled to the one or more interfaces;
a processor configured to:
receive a first GFP frame that comprises a payload area including a variable length client payload field and a payload header that is at one end of the variable length client payload field so that the payload header is transmitted before the variable length client payload field;
add information related to protection switching to a command field;
append the command field to the other end of the variable length client payload field within the GFP frame; and
transmit the GFP frame over the working link or protection link via the one or more interfaces.

12. The apparatus of claim 11, wherein the processor is configured to add information comprising automatic protection switching (APS) architecture information, switch priority information, switch action requests, request type information, bi-directional transmission capabilities, and channel information.

13. The apparatus of claim 11, wherein the processor is further configured to:
compare a command field of a currently received GFP frame to a command field of a previously received GFP frame to find a difference between the command fields; and
generate an interrupt in response to finding a difference between the command fields, wherein the interrupt causes termination of transmissions on the working link.

14. The apparatus of claim 11, wherein processor is configured to add the information comprising at least automatic protection switching (APS) information normally contained in K1 and K2 bytes as defined in synchronous optical network (SONET) or synchronous digital hierarchy (SDH) standards.

15. The apparatus of claim 11, wherein the processor is further configured to:
detect a failure in the working link;
switch communication from the working link to the protection link;
transmit protection switch information in the first GFP frame over the protection link indicating the working link failure; and
receive a new GFP frame over the protection link acknowledging that protection switching is complete.

16. The apparatus of claim 15, wherein the processor is further configured to transmit a client signal failure frame over a portion of the failed working link that is not failed.

17. The apparatus of claim 11, wherein the processor is further configured to:
receive over the protection link a new GFP frame comprising protection switch information in a command field indicating failure in the working link;
switch communication to the protection link based on the protection switch information;
generate a second GFP frame comprising protection switch information in a command field acknowledging that protection switching is complete; and
transmit the second GFP frame over the protection link.

18. The apparatus of claim 17, wherein the processor is configured to transmit the second GFP frame over a different working link in addition to or instead of over the protection link.

19. The apparatus of claim 18, further comprising N plurality of working links, wherein the processor is configured to transmit the second GFP frame via the N plurality of working links or the protection link in a 1:N protection scheme, wherein the protection link protects the N plurality working links and when a working link fails the processor is further configured to reroute traffic via the remaining N−1 working links and/or the protection link.

20. The apparatus of claim 11, wherein the processor is configured to append the command field to the end of the variable length client payload field such that the command field is transparent to a synchronous optical network (SONET) or synchronous digital hierarchy (SDH) cloud.

21. The apparatus of claim 11, wherein the processor is configured to append the command field comprising the protection switch information in lieu of a frame checking sequence (FCS).

22. A non-transitory computer-readable medium that stores code, which when executed by a processor, cause the processor to:
receive a first generic framing procedure (GFP) frame for transmission over a working link or a protection link, wherein the GFP frame comprises a payload area including a variable length client payload field and a payload header that is at one end of the variable length client payload field so that the payload header is transmitted before the variable length client payload field;
add information related to protection switching to a command field;
append the command field to the other end of the variable length client payload field within the GFP frame; and
transmit the GFP frame over the working link or protection link.

23. The non-transitory computer-readable medium of claim 22, wherein the code that causes the processor to add the information comprises code configured to add automatic protection switching (APS) architecture information, switch priority information, switch action requests, request type information, bi-directional transmission capabilities, and channel information.

24. The non-transitory computer-readable medium of claim 22, further comprising code configured to cause the processor to:
compare a command field of a currently received GFP frame to a command field of a previously received GFP frame to find a difference between the command fields; and
generate an interrupt in response to finding a difference between the command fields, wherein the interrupt causes termination of transmissions on the working link.

25. The non-transitory computer-readable medium of claim 22, wherein the code that causes the processor to add the information comprises code configured to add information comprising at least automatic protection switching (APS) information normally contained in K1 and K2 bytes as defined in synchronous optical network (SONET) or synchronous digital hierarchy (SDH) standards.

26. The non-transitory computer-readable medium of claim 22, further comprising code configured to cause the processor to:
detect a failure in the working link;
switch communication from the working link to the protection link;

transmit the protection switch information in the first GFP frame over the protection link indicating the working link failure; and
receive a new GFP frame over the protecting link acknowledging that protection switching is complete.

27. The non-transitory computer-readable medium of claim 26, wherein the code that causes the processor to transmit further comprises code configured to transmit a client signal failure frame over a portion of the failed working link that is not failed.

28. The non-transitory computer-readable medium of claim 22, further comprising code configured to cause the processor to:
receive over the protection link a new GFP frame comprising protection switch information indicating a failure in the working link;
switch communication to the protection link based on the protection switch information;
generate a second GFP frame comprising protection switch information in a command field acknowledging that protection switching is complete; and
transmit the second GFP frame over the protection link.

29. The non-transitory computer-readable medium of claim 28, wherein the code that causes the processor to transmit the second GFP frame comprises code configured to transmit the second GFP frame over a different working link in addition to or instead of transmitting over the protection link.

30. The non-transitory computer-readable medium of claim 29, wherein the code that causes the processor to transmit the second GFP frame comprises code configured to transmit via N plurality of working links or the protection link in a 1:N protection scheme, wherein the protection link protects N working links and when a working link fails further comprising logic configured to reroute traffic via the remaining N−1 working links and/or the protection link.

31. The non-transitory computer-readable medium of claim 22, wherein the code that causes the processor to append the command field comprises code configured to append the command field such that the command field is transparent to a synchronous optical network (SONET) or synchronous digital hierarchy (SDH) cloud.

32. The non-transitory computer-readable medium of claim 22, wherein the code that causes the processor to append the command field comprises code configured to append the command field comprising the protection switch information in lieu of a frame checking sequence (FCS).

\* \* \* \* \*